United States Patent
Thayer (10) Patent No.: US 6,892,248 B2
(45) Date of Patent: May 10, 2005

(54) METHOD AND APPARATUS FOR CONFIGURING A PORT ON A LEGACY-FREE DEVICE FOR GENERAL I/O PURPOSES OR DEBUGGING PURPOSES

(75) Inventor: Paul Anthony Thayer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 09/790,426

(22) Filed: Feb. 21, 2001

(65) Prior Publication Data

US 2002/0116604 A1 Aug. 22, 2002

(51) Int. Cl.[7] .................... G06F 3/00; G06F 13/00; G06F 13/12
(52) U.S. Cl. .................... 710/2; 710/1; 710/2; 710/15; 710/17; 710/36; 713/1; 713/2; 713/100; 714/47
(58) Field of Search ................ 710/1, 2, 15, 17, 710/36, 5, 6, 7, 10, 33, 37; 713/1, 2, 100; 714/47

(56) References Cited

U.S. PATENT DOCUMENTS

| | | | | |
|---|---|---|---|---|
| 4,809,167 A | * | 2/1989 | Pawloski et al. | 703/27 |
| 4,939,637 A | * | 7/1990 | Pawloski | 703/26 |
| 6,463,588 B1 | * | 10/2002 | Jenkins et al. | 725/127 |
| 6,578,158 B1 | * | 6/2003 | Deitz et al. | 714/11 |

OTHER PUBLICATIONS

"Art of Assembly Language: Chapter twenty–two", Sep. 30, 1996, Chapter 22, Section 22.1.*
"Debug Port Specification", Microsoft Corp., Feb. 9, 2000.
"Unchaining the PC: Improved Ease of Use Key to Future Industry Growth", Intel Corporation, Nov. 1998.
*Advanced Configuration and Power Interface Specification*, Revision 2.0, pp. i–xiv, 1–18, 85–106, Jul. 27, 2000.

* cited by examiner

Primary Examiner—Jeffrey Gaffin
Assistant Examiner—Angel L. Casiano
(74) Attorney, Agent, or Firm—Joseph R. Burwell; Mark S. Walker; Cynthia S. Byrd (57) ABSTRACT

A method, system, apparatus, and computer program product are presented for enabling a hidden port in a computing device. A determination is made as to whether the computing device has a hidden port, which is a port that is externally inaccessible to a user of the computing device and is not dedicated for general input/output (I/O) purposes. If the computing device has a hidden port, then the computing device is configured to use the hidden port for general I/O purposes and possibly also for debugging purposes. The user may optionally specify a data value that can be used to indicate whether the user chooses for the hidden port to be enabled for general I/O purposes and/or for debugging purposes. The hidden port optionally may or may not be enabled based on whether the computing device is a legacy-free device.

37 Claims, 3 Drawing Sheets

A hidden port has been detected. How would you like to use it?
1) Disable. Do not use.
2) Enable for debugging.
3) Enable for general purpose use.
4) Enable for both debugging and general purpose use.

METHOD AND APPARATUS FOR CONFIGURING A PORT ON A LEGACY-FREE DEVICE FOR GENERAL I/O PURPOSES OR DEBUGGING PURPOSES

BACKGROUND OF THE INVENTION

1. Field of the Invention

The present invention relates to an improved data processing system and, in particular, to a method and system for input/output in a data processing system. Still more particularly, the present invention provides a method and system for input/output port configuring and use.

2. Description of Related Art

For decades, IBM®-compatible personal computers (PCs) and derivative designs have provided two RS-232 serial ports as standard input/output ports. Initially, a keyboard was connected to one of these ports, leaving one port available for another device, such as a modem. When the mouse became popular, many users desired to connect a keyboard, mouse, and modem to their PC. The PC architecture expanded to provide standard mouse and keyboard ports, freeing up the two serial ports for other devices. Commonly, a modem was connected to one of the serial ports. Often the other port was used for a PC-to-PC "null modem" connection, allowing two PCs to communicate before the popularity of Local Area Network (LAN) Network Interface Cards (NICs) made inter-system communication widely available. Because these two ports have been available for many years, many peripheral devices were designed to connect and communicate with a personal computer via one of these ports. Significant investments have been made in acquiring a wide range of computer peripheral devices that connect to personal computers through an RS-232 serial port.

The hardware portion of the traditional RS-232 serial port was generally provided by an inexpensive 16550A Universal Asynchronous Transmitter/Receiver (UART), either in a standalone package or as part of another Application Specific Integrated Circuit (ASIC). The software portion of the traditional RS-232 port provided visibility to system software as a COM port. For years, all IBM-compatible PCs and derivatives have provided COM1 and COM2 as standard RS-232 ports. The PC BIOS (Basic Input/Output System), which is a read-only memory (ROM) inside the PC that contains essential routines and data for system startup and system configuration, provides the location of these hardware ports to software programmers starting at physical memory offset 40:0. System software detects the presence and location of these serial ports by examining these physical memory locations. From this information, communication with external serial devices via these ports can occur.

In addition to using a serial port for peripheral devices, a rare but critical use of a serial port is for software debugging and diagnostic purposes. To minimize system disruption by diagnostic aides, many operating systems provide a very low-level debugging capability. Operation and status of critical system software, such as operating systems, file systems, device drivers, etc., cannot easily be viewed, as the personal computer's video display and keyboard are reserved for user applications. Instead, a method for independently querying system operation and status is provided via an alternate input/output vehicle; a software engineer can gain access to the internal workings of the operating system via a PC-to-PC null-modem cable connected to a serial port. Standard serial ports were ideal for software debugging because of their ubiquity and the basic port I/O interface.

As the use of computers expanded, more computers, peripheral devices, and users made increasing demands on the two standard serial ports. As demand exceeded the capabilities of the initial serial port design, new protocols were developed to handle the increased needs. The development of LAN technology displaced the use of serial ports for PC-to-PC communication. Later, the Universal Serial Bus (USB) protocol was developed to handle peripherals. The USB protocol has many desirable features, such as hot attach and detach, automatic peripheral detection and identification, higher bit rates, and increased capacity for simultaneously connected devices.

The advent of USB devices has prompted system providers to discourage the use of, and even the presence of, traditional serial ports on the personal computer in favor of USB devices. USB Implementers Forum, Inc. (USB-IF) is a non-profit corporation founded by the group of companies that developed the USB specification. The USB-IF was formed to provide a support organization and forum for the advancement and adoption of Universal Serial Bus technology. The Forum facilitates the development of high-quality compatible USB peripherals and devices and promotes the benefits of USB and the quality of products that have passed compliance testing.

In an ongoing effort to make personal computers less expensive and easier to use, a new class of "legacy-free" machines has been introduced. One requirement of these machines is that peripheral devices be attached to the computer via the Universal Serial Bus. To enforce this requirement, these machines do not provide traditional RS-232 serial communication ports. Several recently produced legacy-free personal computers adhere to recommendations of the PC System Design Guide and no longer provide traditional RS-232 serial port interfaces. For example, both the IBM® Net Vista S40, available from International Business Machines Corporation, and the Compaq® iPaq Legacy Free model, available from Compaq Computer Corporation, do not provide traditional serial ports. It is anticipated that many other personal computer models will likewise no longer provide traditional serial ports.

Legacy-free machines are designed to be low-cost and easy to use, but evolving PC standards occasionally inconvenience users. This is the case with new legacy-free machines which do not provide access to a serial port. Most legacy-free machines include a USB keyboard and mouse, so there is generally no need to connect traditional non-USB keyboard and mouse peripherals. However, older devices, i.e., "legacy" devices, which use the RS-232 serial port interface, such as a mouse, keyboard, modem, joystick, tablet, MIDI devices, etc., can no longer be directly attached to the computer. Instead, the computer user is either expected to replace all these legacy devices with new USB devices, or the user may purchase a USB-to-serial adapter that converts the USB protocol back to the traditional RS-232 protocol. This "designed obsolescence" imposes a financial and logistical burden on users with RS-232 devices.

Even if a computer user decides to replace these legacy devices with new USB devices, some of these legacy devices are not available in new USB versions. Even if a corresponding USB device is available, a new device must be purchased while the previously used device must be recycled or discarded. New USB devices require software support on the desired operating system platform, which may not be available. Although USB devices can be easy-to-use when functioning as designed, there may be problems when certain USB devices do not conform to expected specifications or are not properly supported by software. In some cases, the USB device cannot be recognized and used by the computer.

As noted above, another strategy is to continue using existing serial devices by adding serial port support to a USB-only system. USB-to-serial adapters, sometimes called "dongles", are available; the adapter provides one USB connector and one or more serial connectors. With appropriately tested and working software for the desired platform, this device provides serial port connections for USB-only computers. Similarly, some USB hubs, whose primary function is to provide additional USB ports, provide a serial port as well.

A non-USB option would be to insert a serial port card into the computer's motherboard. The specifications for legacy-free computers allow PCI-type card connectors, so only PCI-type serial port cards would connect to a legacy-free device's motherboard while older serial port cards, such as ISA-type cards, would not connect. Unfortunately, most legacy-free machines are constructed to be inexpensive, so most legacy-free machines do not have a PCI card slot, and it is not possible to add a PCI-type serial port card.

Clearly, any attempt to use existing serial devices with a legacy-free machine incurs expenses in money and time—both engineering and administrative time. Therefore, it would be advantageous for a method and/or apparatus to provide at least one general-purpose serial port on a legacy-free machine so that a user may have the benefit of continuing to use existing serial-communication-type peripheral devices with a legacy-free machine without resorting to the above-mentioned options, such as USB adapters.

SUMMARY OF THE INVENTION

A method, system, apparatus, and computer program product are presented for enabling a hidden port in a computing device. A determination is made as to whether the computing device has a hidden port, which is a port that is externally inaccessible to a user of the computing device and is not dedicated for general input/output (I/O) purposes. If the computing device has a hidden port, then the computing device is configured to use the hidden port for general I/O purposes and possibly also for debugging purposes. The user may optionally specify a data value that can be used to indicate whether the user chooses for the hidden port to be enabled for general I/O purposes and/or for debugging purposes, and the computing device is configured to use the hidden port for general I/O purposes and/or for debugging purposes in accordance with the user-specified data value. Prior to enabling the hidden port, a determination may also be made as to whether the computing device is a legacy-free device, and the computing device can be configured to use the hidden port for general I/O purposes in response to a determination that the computing device is a legacy-free device.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention describes a method, apparatus, system, and computer program product that provides at least one general-purpose serial port on a legacy-free machine so that a user may have the benefit of continuing to use existing serial-communication-type peripheral devices with a legacy-free machine. With the present invention, a user may attach and use a serial device on a legacy-free machine in a manner similar to attaching and using a serial device on a legacy machine without resorting to the various other options, such as USB adapters.

To accomplish this goal, the present invention uses a legacy-free machine as described below. As previously mentioned, a rare use of a traditional serial port is for software debugging. Hence, the elimination of serial ports on legacy-free machines introduced another problem in addition to the elimination of the ability to use serial peripherals: the elimination of the ability to access the system software on these machines for debugging purposes.

In general, a simple, non-intrusive, low-level interface is desired so that the debugging process is minimally invasive. Given the essential need to provide debugging capability for legacy-free machines, and the superior characteristics of the traditional serial port for this purpose, most legacy-free machines have an internal "debug header" RS-232 serial port, also termed a debug port, for debugging purposes. That is, even though the traditional, user-accessible serial ports were eliminated, an optional debug header serial port may be provided for access by service personnel.

In fact, a debug header serial port is provided on many commercially available, legacy-free systems, but the debug port would not used for debugging purposes by a typical computer user. Moreover, given the manner in which legacy-free machines are constructed, the debug port is not accessible by an end-user, i.e., the debug port is a "hidden port", a "user-invisible port", or a "user-inaccessible port"; the port is directly attached to the motherboard and can only be reached by opening a legacy-free machine and gaining access to the motherboard. Thus, an RS-232 port may be present within a legacy-free machine, but the user cannot use it. Although the debug header serial port may be used briefly only for debugging purposes on some legacy-free machines, the debug header serial port on most machines will likely remain idle its entire life.

The present invention recognizes that, in the vast majority of cases, a user of a legacy-free machine would desire to have a serial port on the legacy-free machine. The present invention greatly increases the value and usability of a legacy-free machine by making the debug header serial port available for general use. A user can extend the useful life of existing peripheral devices, such as RS-232 serial devices, at minimal expense while enjoying other useful features of legacy-free machines. In order to do so, the debug header serial port is configured as a general purpose serial port; both physical (hardware) and logical (software) configuration is necessary.

Before describing the present invention in more detail, a typical debug header serial port and its typical use is first described, and then a description is provided for the manner in which the present invention provides a general purpose serial port on a legacy-free machine.

Figure 1A:
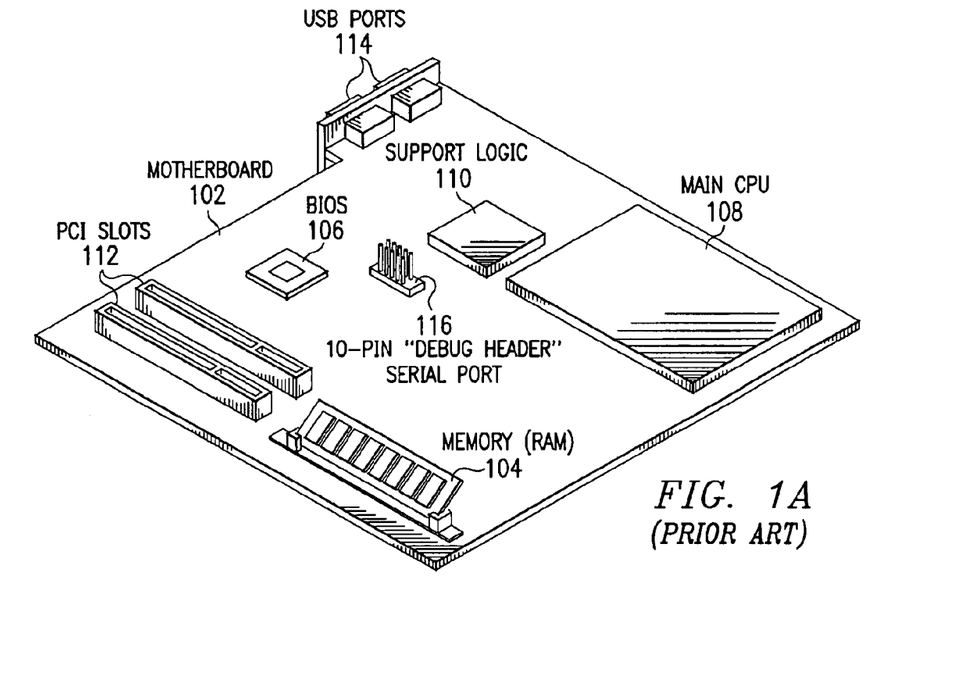
FIG. 1A depicts a motherboard within a typical legacy-free personal computer.

With reference now to FIG. 1A, a motherboard within a typical legacy-free personal computer is depicted. Motherboard 102 includes an internal system bus that interconnects the various components located on the motherboard: random access memory (RAM) 104; BIOS (Basic Input/Output System) 106; main CPU (Central Processing Unit) 108; support logic 110, which may include one or more chips; PCI slots 112, into which a user may insert various types of PCI-cards; USB ports 114; and debug header serial port 116.

Those of ordinary skill in the art will appreciate that the hardware shown in FIG. 1A may vary depending on the system implementation. For example, the system may have one or more processors and one or more types of non-volatile memory. Other components could be used in addition to or in place of the components shown in FIG. 1A, and the depicted examples are not meant to imply architectural limitations with respect to the present invention.

Figure 1B:
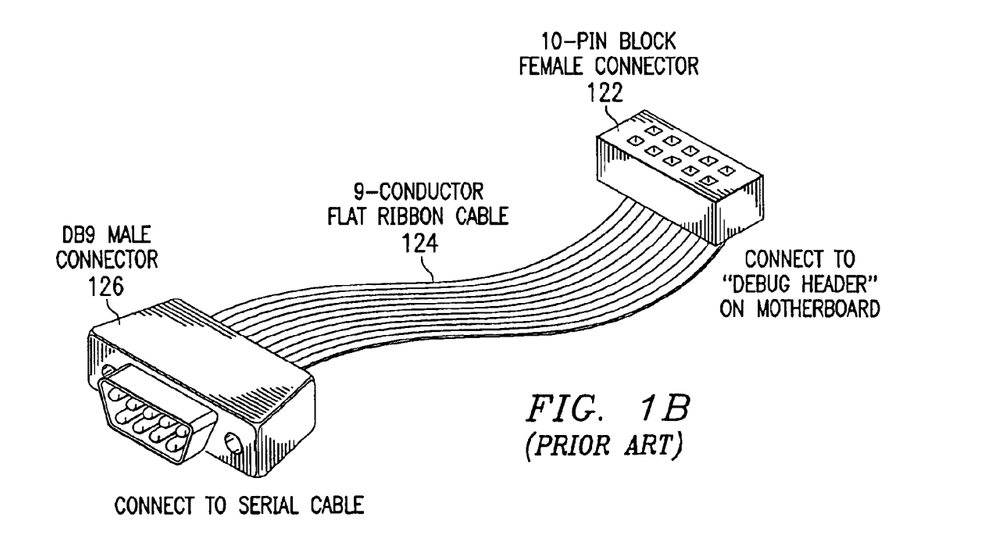
FIG. 1B depicts a commercially available ribbon cable for use with a debug header serial port.

With reference now to FIG. 1B, a commercially available ribbon cable is depicted for use with the debug header serial port. An inexpensive, electronically passive, 9-pin, 9-conductor ribbon cable can be attached to the debug header serial port on the motherboard in order to gain physical use of the port. For example, FIG. 1B shows an example of a commercially available cable comprising 10-pin block female connector 122, 9-conductor flat ribbon cable 124, and DB9 male connector 126. Block connector 122 can be connected to debug header serial port 116, shown in FIG. 1A. Ribbon cable 124 can then be routed to the back of the legacy-free personal computer so that DB9 connector 126 can be mounted. This arrangement provides a DB9 physical connector, mounted on the legacy-free machine's case, which leads to the RS-232 debug header serial port on the system motherboard.

Figure 1C:
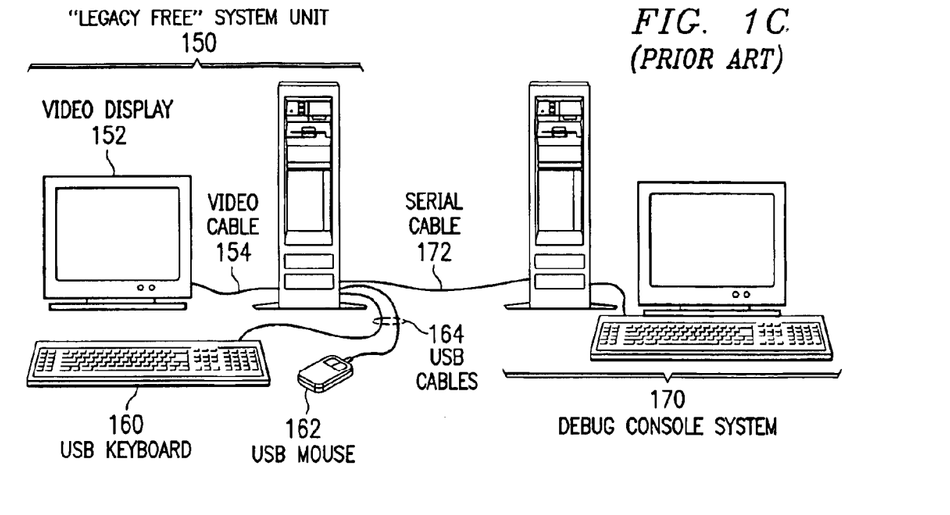
FIG. 1C depicts a typical use of a debug header serial port with a debug console system connected to a modified legacy-free machine through the debug header serial port.

With reference now to FIG. 1C, a typical use of a debug header serial port is shown with a debug console system connected to a modified legacy-free machine through the debug header serial port. Legacy-free system unit 150 connects to video display 152 via video cable 154 for displaying text, graphics, etc. Legacy-free system unit 150 also connect to various input/output devices, such as USB-type keyboard 160 and USB-type mouse 162, via USB cables 164.

If someone desires to conduct a debugging session with the legacy-free machine, debug console system 170 can be connected to legacy-free system unit 150 via a PC-to-PC null-modem cable or a modem cable, such as serial cable 172, to a DB9 male connector that has been attached to legacy-free system unit 150 that has been modified in the manner described with respect to FIG. 1B. In a typical debug environment, there are two computers involved: (1) the test machine that is being debugged; and (2) the debug console that is used for input/output to "talk" to the debugger code on the test machine and display its output. The debug machine could be remotely connected to the test machine over a modem or locally connected without a modem, but in either case, a serial modem-like connection is used.

Normally, the test machine runs along at normal speed. However, the test machine's serial port is listening for an interrupt from the debug console. If the operator on the debug console inputs a special character (usually <break> or Control-C) on the debug console keyboard, that break character is sent to the test machine's serial port. The test machine, seeing the break character, freezes the test machine's normal operation and jumps to the test machine's debug code. The debug code sends information out the serial port to the debug console, in effect communicating that it is ready for the debugging process. At this point, a debugging "conversation" can occur between the operator at the debug console and the test machine system software. The operator at the debug console can also release the test machine from debug mode so that it runs normally again.

If the flow of characters sent to the test machine's serial port never contains a break character, the test machine can use the serial port for any general purpose, such as using a Web browser to talk to an ISP (Internet Service Provider) through the serial port to a modem. For example, the cable from the test machine could be disconnected from the debug console and reconnected to a modem, although there is some risk to this. If the ISP sends a break character, which could possibly happen while downloading a file, the debugger will be triggered into action. While the test machine is running normally, one could set a switch on the test machine to disable the debugger, so that it is no longer triggered by the break character. This would eliminate the risk that the test machine would inadvertently jump into the debugger. As long as the test machine has the debugger disabled or receives no break characters, its serial port can be used for general, non-debug use.

In practice, users do not run debug-enabled software. Debug-enabled software is larger, runs slower, and carries a security risk because someone might break into the user's machine through the debugger and get control of the machine. Instead, when service is needed, the normal software is replaced with debug-enabled software, after which the system is serviced.

While the debug header serial port has been included in legacy-free systems for the explicit purpose of conducting debug sessions with legacy-free systems, the present invention recognizes that the hardware modifications to a legacy-free machine that allows its debug header serial port to be used for debug purposes could also allow its debug header serial port to be used for general purposes.

Figure 1D:
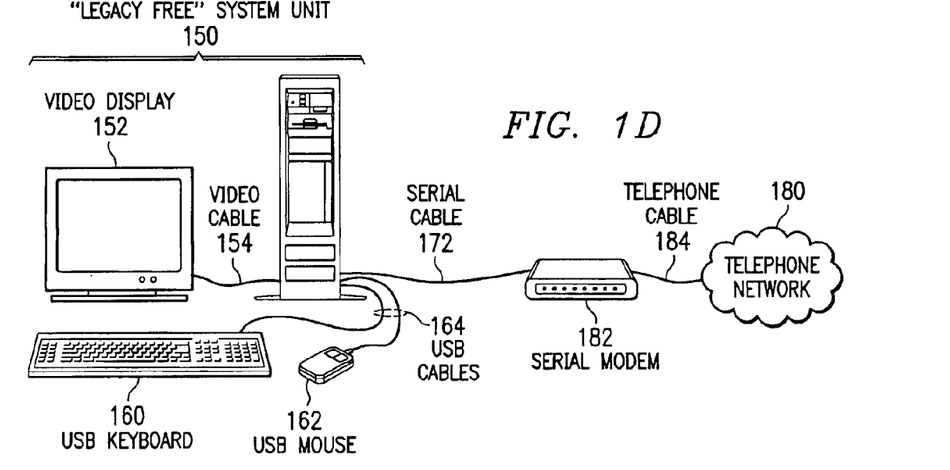
FIG. 1D depicts a modified legacy-free system using a debug header serial port for general purposes in accordance with a preferred embodiment of the present invention.

With reference now to FIG. 1D, a modified legacy-free system is shown using a debug header serial port for general purposes in accordance with a preferred embodiment of the present invention. Legacy-free system unit 150 has been modified in the manner described with respect to FIG. 1B. Legacy-free system unit 150 connects to video display 152 via video cable 154 for displaying text, graphics, etc. Legacy-free system unit 150 also connect to various input/output devices, such as USB-type keyboard 160 and USB-type mouse 162, via USB cables 164.

In contrast to conducting a debugging session on the legacy-free machine, as shown in FIG. 1C, serial cable 172 allows the legacy-free machine to connect to other types of serial peripheral devices. For example, legacy-free system unit 150 can connect to telephone network 180 via serial modem 182 and telephone cable 184.

As noted above, the present invention configures the debug header serial port as a general purpose serial port. To do so, the debug header serial port is configured physically with hardware in a known manner as described above. The present invention also logically configures a legacy-free machine through software to allow the debug header serial port to be used for general purposes, as shown in FIG. 1D. Any general purpose RS-232 serial device can then be connected to the modified legacy-free machine.

Figure 2:
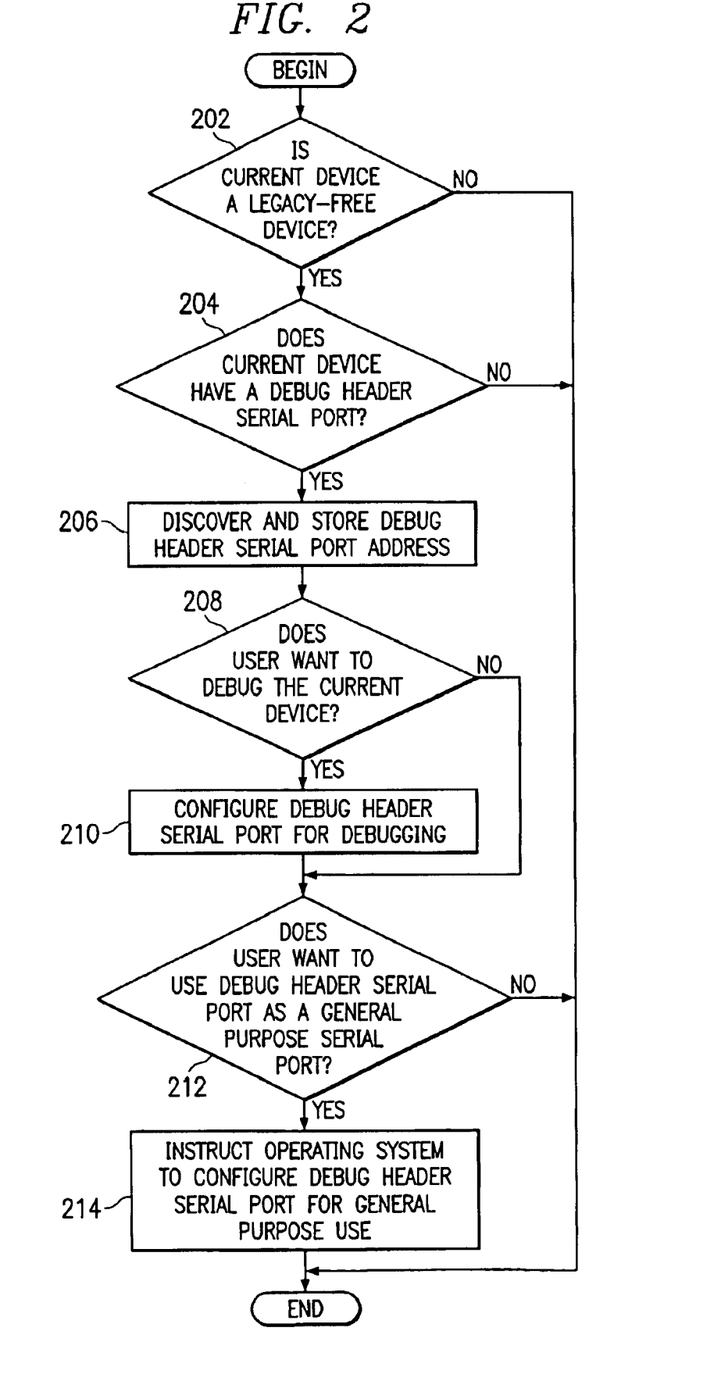
FIG. 2 is a flowchart that depicts a process for logically configuring a legacy-free device so that its debug header serial port may be used as a general purpose serial port in accordance with a preferred embodiment of the present invention.

With reference now to FIG. 2, a flowchart depicts a process for logically configuring a legacy-free device so that its debug header serial port may be used as a general purpose serial port in accordance with a preferred embodiment of the present invention. The process shown in FIG. 2 would be incorporated into a larger system initialization process.

The process begins with a determination of whether or not the device that is currently being configured is a legacy-free device (step 202). If the current device is not a legacy-free device, then there is no need to configure the device in any special manner to use its debug header serial port, and the process is complete. If the current device is a legacy-free device, then the configuration process proceeds.

The present invention is contemplated as being adaptable to a variety of hardware and software environments. Hence, the manner by which a legacy-free device could be detected would vary depending upon the system hardware, its operating system, etc. If the legacy-free device is a version of a personal computer using an Intel® processor running under the Microsoft® Windows® operating system, the Advanced Configuration and Power Interface (ACPI) specification describes a manner for determining whether or not the device is a legacy-free device. The ACPI specification, which is described in "Advanced Configuration and Power Interface Specification", Revision 2.0, Jul. 27, 2000, was developed to establish common interfaces that enable robust operating system-directed motherboard device configuration and power management of both devices and whole systems. In general, the ACPI specification describes how system software may use various configuration values and flags. For example, in Section 5.2.8.3, the ACPI specification describes the location and purpose of a set of IA-PC Boot Architecture Flags that can be used at boot time to assist in determining what steps should be performed in booting a device. One of the bit flags, "LEGACY_DEVICES", indicates that the motherboard supports "user-visible devices", i.e., devices that have end-user accessible connectors; this particular flag could be used in step 202 to determine whether the current device is a legacy-free device. It should be noted, however, that some hardware manufacturers may not follow the ACPI specification. Hence, the determination of whether or not the current device is a legacy-free device may need to be performed in another manner that depends upon the system hardware and software.

The process resumes by determining whether or not the current device has a debug header serial port (step 204). If the current device does not have a debug header serial port, then there is no need to configure the device in any special manner with respect to a debug header serial port, and the process is complete. If the current device has a debug header serial port, then the configuration process proceeds.

The manner by which a debug header serial port could be detected would vary depending upon the system hardware, its operating system, etc. Again, referring to the ACPI specification at Section 5.2.5, it describes one manner in which information for the debug header serial port can be found through a system description table. Using the signature "DBGP", one can search for a Debug Port Table; the Debug Port Table provides information for the debug port, i.e., the debug header serial port. More information about using the debug port on a Windows-Intel platform can be found in "Debug Port Specification", Version 1.0, Microsoft Corporation, Feb. 09, 2000. For example, the Debug Port Specification states that the presence or non-presence of the Debug Port Table indicates the presence or non-presence of a debug port within the system.

The process resumes by discovering and storing the address of the debug header serial port for use in subsequent steps (step 206). A determination is then made as to whether or not the current device is to be used for debugging (step 208). If not, then the process skips the following step. If so, then the current device and/or its debug header serial port is configured in the appropriate manner (step 210). The user may have previously selected a configuration option that indicates that the current device is to be used for debugging, as described in more detail further below.

Whether or not the current device is to be used for debugging, as determined by step 208, the configuration process then proceeds with a determination of whether or not the user wants to use the debug header serial port as a general purpose serial port (step 212). If not, then there is no need to configure the device in any special manner with respect to a debug header serial port, and the process is complete. Again, the user may have previously selected a configuration option that indicates that the current device is to be used for debugging, as described in more detail further below.

At this point, it has been determined that the current device is a legacy-free device with a debug header serial port that the user has requested to be used as a general purpose serial port. Hence, the operating system is instructed to configure the debug header serial port for general purpose use in the appropriate manner (step 214). The process for logically configuring a legacy-free device so that its debug header serial port may be used as a general purpose serial port is then complete, and the system may continue with other initialization tasks.

Again, it should be noted that the manner in which the hidden port is configured for general purpose use may vary depending upon the hardware platform, the operating system, etc. The order and number of steps within the method may vary, and there may be other conditions that must verified, cleared, checked, or otherwise modified before a hidden port can be enabled. For example, a particular device may not be a legacy-free device yet may have a hidden port, and the hidden port could then be enabled without regard to the fact that the device is a legacy device, thereby providing an additional port for the legacy device. In that case, however, additional checks might be necessary to ensure that the enablement of the hidden port does not interfere with the operation of other ports on the legacy device.

As an example of configuring a Windows-Intel platform personal computer, according to the "Debug Port Specification" mentioned above, the address of the debug port is indicated in the "BASE_ADDRESS" field; the address of the debug header serial port can then be copied to the appropriate memory location that corresponds to the desired COM port number. For example, the address of the debug header serial port can be written to BIOS Data Area Physical Memory Address 40:0 for COM1; BIOS Data Area Physical Memory Address 40:2 for COM2; BIOS Data Area Physical Memory Address 40:4 for COM3; and BIOS Data Area Physical Memory Address 40:6 for COM4. In this manner, the current device is configured so that data that is sent or received by software through one of the logical COM ports is physically sent or received using the debug header serial port. In other systems, physical ports and logical ports may be mapped in a different manner.

Figure 3:
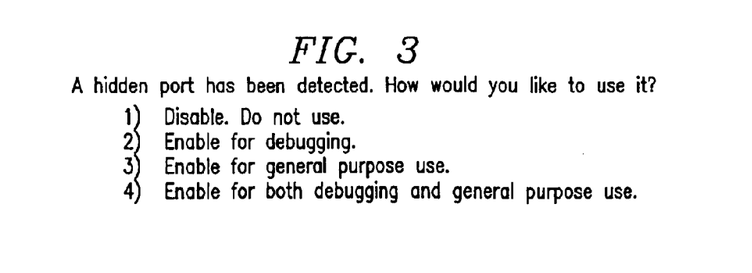
FIG. 3 is a screen shot that depicts a BIOS setup page by which a user can be queried with respect to configuration preferences for a hidden port.

With reference now to FIG. 3, a screen shot depicts a BIOS setup page by which a user can be queried with respect to configuration preferences for a hidden port. Assuming that a hidden port is present on a system and has been detected, e.g., by using the process described with respect to steps 202 and 204 in FIG. 2, there are several methods by which the user may indicate the desire to use the hidden port as a general purpose port.

One method is to use a system BIOS setting. The BIOS setup page, typically presented during the computer bootup phase, can provide a new user option. In general, if the user is not presented with a BIOS setup page during the system bootup phase, the BIOS setup pages can be invoked at the option of the user by pressing some special key or key combination, such as the Delete key or the Escape key, during system initialization. One of the BIOS setup pages may comprise a new selection menu similar to that shown in FIG. 3.

One advantage of using the BIOS is that a change to the BIOS can be done as part of the manufacturing process of the machine and thereby replicated on many machines. Hence, the machine is pre-programmed to allow the user to make a choice about using a hidden serial port. Another advantage of using a system BIOS setting is that it provides a common, standard location for the setting, which is then available from that common location to all operating systems that adhere to the standard. Thus, all operating systems using that common BIOS no longer need to provide a setting capability; the operating systems need only be able to read what the user has selected in the BIOS and act appropriately. The disadvantage of a BIOS change is that it is a manufacturing upgrade that cannot be applied to previously shipped computers.

For previously shipped computers without the BIOS change, the setting would need to be accommodated through an operating system configuration file. Hence, another method to indicate the user's intent with respect to a hidden port could comprise a new entry in a configuration file. Configuration files are consulted by the operating system during system startup to determine how certain system resources might be used. Example configuration files are: config.sys, win.ini, /etc/inittab, kdb.ini, etc. The advantage of using an operating system specific configuration file is that it can be used without a BIOS change, which can cripple a device if performed incorrectly.

As shown in the options in FIG. 3, in some circumstances, it may be desirable to configure the hidden port as both a debug port and a general purpose port. When debug information is to be transmitted, the service personnel running the debug session can use the debug terminal, connected to the hidden port, to "break into" the debugger and proceed to debug the system software. When service personnel allow the system to run normally, the system may then use the hidden port with a general purpose I/O device.

It should be noted that the detailed description for FIG. 3 refers to a generalized hidden port. In one exemplary embodiment, the present invention concerns the enablement of a particular type of hidden port, i.e., the debug header serial port, on a legacy-free device; this serial port may be present but rendered unusable for general use by the architecture of legacy-free personal computers. However, it is possible that other legacy ports, such as mouse, keyboard, printer, floppy drive, etc., will also be present on a particular hardware platform yet rendered unusable for general purpose use because these ports can no longer be detected by legacy operating system software. With the present invention, using methods similar to those described above for the debug header serial port, these other hidden, legacy ports might be detected, then configured, at the option of the user for general purpose use.

It should be noted that the terms "hidden port", "debug port", "debug serial port", "debug header serial port", "user-invisible port", and "user-inaccessible port" have been used herein, depending upon the context, to refer to a port against which the present invention may be applied. The "Debug Port Specification" recites two physical requirements for a "debug port":

The Debug Port connector must not be easily accessible to the end user so that the end user does not accidentally connect any devices to this port. It should, however, be relatively easy to access by field support personnel (for example, behind a removable panel).

The Debug Port connector must be dedicated for use for system debugging (or as a management port).

With respect to the present invention, the most generalized term is recognized as a "hidden port". A "hidden port" is defined as: (1) a port that is not externally accessible (i.e., externally inaccessible) to an end user, typically being internal to a computing device in some manner; and (2) a port that is not dedicated for general purpose use.

The advantages of the present invention should be apparent in view of the detailed description of the invention that is provided above. In general, legacy-free machines are designed to be small, compact, and low-cost. For users in need of a RS-232 device connection, however, this low cost is somewhat compromised by the need to purchase additional hardware and software. By utilizing the debug header RS-232 port hidden within a legacy-free machine, users may avoid considerable expense in purchasing new peripherals by extending the life of existing serial peripherals while enjoying other useful features of legacy-free machines.

Given that the debug header serial port was originally provided to allow low-level debugging access to system software, an issue arises as to whether a security risk is created if the debug header serial port is used as a general purpose serial peripheral connection port. However, no security risk is introduced. The system software installed on commercially available machines is devoid of any debug capability. Thus, access to the serial port does not imply access to system debugging capability. The desired, and typical use, would be that the system software have no debugging capability, and the serial port would instead be used for connecting to a general purpose, serial peripheral device.

The present invention could be used to enable multiple hidden ports for general purpose use if available. However, only one debug header serial port is typically provided on a legacy-free personal computer; therefore, only one serial port can be enabled for general purpose use, although this single port may be of great value to many users. For example, a USB mouse and a USB keyboard is typically provided with each legacy-free computer, hence the newly enabled serial port is not needed for a mouse or a keyboard. Also, these machines often provide a NIC, so the newly enabled port would not be needed for LAN communications. Thus, the newly enabled port is available for many other uses. The most typical use might be for continued use of an existing, external serial modem, and being able to continue to use existing external serial dialup modems may have significant value in certain installations. Many computer applications require only one other data connection for the computer. For example, in the banking industry, computers are often used to run Automated Teller Machines, or ATMs. Enabling a single serial port may allow continued use of existing serial dialup modems in thousands of locations. The low-cost and ease-of-use of legacy-free machines can be enjoyed without incurring the cost of replacing or refitting other existing hardware.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disk, hard disk drive, RAM, and CD-ROMs and transmission-type media, such as digital and analog communications links. For example, the present invention could be embodied in a set of instructions and incorporated into a ROM with other system software.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for enabling a port in a computing device, the method comprising the steps of:
   determining whether the computing device has a hidden port, wherein the hidden port is a port in the computing device that is externally inaccessible to a user of the computing device and is not dedicated for general input/output (I/O) purposes; and
   if the computing device has a hidden port, configuring the computing device to use the hidden port for general I/O purposes.

2. The method of claim 1 further comprising:
   configuring the computing device to use the hidden port for general I/O purposes and for debugging purposes.

3. The method of claim 1 further comprising:
   prior to configuring the computing device to use the hidden port for general I/O purposes, determining whether a user-specifiable data value indicates that the hidden port is to be enabled for general I/O purposes and for debugging purposes; and
   configuring the computing device to use the hidden port for general I/O purposes and for debugging purposes in response to a determination that the user-specifiable data value indicates that the hidden port is to be enabled for general I/O purposes and for debugging purposes.

4. The method of claim 3 wherein the user-specifiable data value is stored within a configuration file.

5. The method of claim 3 wherein the user-specifiable data value is a stored as a BIOS data value.

6. The method of claim 1 further comprising:
   prior to configuring the computing device to use the hidden port for general I/O purposes, determining whether a user-specifiable data value indicates that the hidden port is to be enabled for general I/O purposes; and
   configuring the computing device to use the hidden port for general I/O purposes in response to a determination that the user-specifiable data value indicates that the hidden port is to be enabled for general I/O purposes.

7. The method of claim 6 wherein the user-specifiable data value is stored within a configuration file.

8. The method of claim 6 wherein the user-specifiable data value is a stored as a BIOS data value.

9. The method of claim 1 further comprising:
   prior to configuring the computing device to use the hidden port for general I/O purposes, determining whether the computing device is a legacy-free device; and
   configuring the computing device to use the hidden port for general I/O purposes in response to a determination that the computing device is a legacy-free device.

10. The method of claim 9 wherein the computing device is indicated as a legacy-free device using a BIOS data value.

11. The method of claim 1 wherein the hidden port is a hidden serial port.

12. The method of claim 1 wherein the hidden port is a debug header serial port.

13. The method of claim 1 further comprising:
    copying a port address for the hidden port to a memory location containing a port address for a general purpose communication port.

14. The method of claim 13 wherein the general purpose communication port is COM1, COM2, COM3, or COM4.

15. The method of claim 1 further comprising:
    mapping between a port address for a logical, general purpose communication port and a port address for the hidden port.

16. A computer program product in a computer readable medium for enabling a port in a computing device, the computer program product comprising:
    instructions for determining whether the computing device has a hidden port, wherein the hidden port is a port in the computing device that is externally inaccessible to a user of the computing device and is not dedicated for general input/output (I/O) purposes; and
    instructions for configuring the computing device to use the hidden port for general I/O purposes if the computing device has a hidden port.

17. The computer program product of claim 16 further comprising:
    instructions for configuring the computing device to use the hidden port for general I/O purposes and for debugging purposes.

18. The computer program product of claim 16 further comprising:
    instructions for determining, prior to configuring the computing device to use the hidden port for general I/O purposes, whether a user-specifiable data value indicates that the hidden port is to be enabled for general I/O purposes and for debugging purposes; and
    instructions for configuring the computing device to use the hidden port for general I/O purposes and for debugging purposes in response to a determination that the user-specifiable data value indicates that the hidden port is to be enabled for general I/O purposes and for debugging purposes.

19. The computer program product of claim 18 wherein the user-specifiable data value is stored within a configuration file.

20. The computer program product of claim 18 wherein the user-specifiable data value is a stored as a BIOS (Basic Input/Output System) data value.

21. The computer program product of claim 16 further comprising:
  instructions for determining, prior to configuring the computing device to use the hidden port for general I/O purposes, whether a user-specifiable data value indicates that the hidden port is to be enabled for general I/O purposes; and
  instructions for configuring the computing device to use the hidden port for general I/O purposes in response to a determination that the user-specifiable data value indicates that the hidden port is to be enabled for general I/O purposes.

22. The computer program product of claim 21 wherein the user-specifiable data value is stored within a configuration file.

23. The computer program product of claim 21 wherein the user-specifiable data value is a stored as a BIOS data value.

24. The computer program product of claim 16 further comprising:
  instructions for determining, prior to configuring the computing device to use the hidden port for general I/O purposes, whether the computing device is a legacy-free device; and
  instructions for configuring the computing device to use the hidden port for general I/O purposes in response to a determination that the computing device is a legacy-free device.

25. The computer program product of claim 24 wherein the computing device is indicated as a legacy-free device using a BIOS data value.

26. The computer program product of claim 16 wherein the hidden port is a hidden serial port.

27. The computer program product of claim 16 wherein the hidden port is a debug header serial port.

28. The computer program product of claim 16 further comprising:
  instructions for copying a port address for the hidden port to a memory location containing a port address for a general purpose communication port.

29. The computer program product of claim 28 wherein the general purpose communication port is COM1, COM2, COM3, or COM4.

30. The computer program product of claim 16 further comprising:
  instructions for mapping between a port address for a logical, general purpose communication port and a port address for the hidden port.

31. An apparatus for enabling a port in a computing device, the apparatus comprising:
  determining means for determining whether the computing device has a hidden port, wherein the hidden port is a port in the computing device that is externally inaccessible to a user of the computing device and is not dedicated for general input/output (I/O) purposes; and
  configuring means for configuring the computing device to use the hidden port for general I/O purposes if the computing device has a hidden port.

32. The apparatus of claim 31 further comprising:
  configuring means for configuring the computing device to use the hidden port for general I/O purposes and for debugging purposes.

33. The apparatus of claim 31 further comprising:
  determining means for determining, prior to configuring the computing device to use the hidden port for general I/O purposes, whether a user-specifiable data value indicates that the hidden port is to be enabled for general I/O purposes and for debugging purposes; and
  configuring means for configuring the computing device to use the hidden port for general I/O purposes and for debugging purposes in response to a determination that the user-specifiable data value indicates that the hidden port is to be enabled for general I/O purposes and for debugging purposes.

34. The apparatus of claim 31 further comprising:
  determining means for prior to configuring the computing device to use the hidden port for general I/O purposes, whether a user-specifiable data value indicates that the hidden port is to be enabled for general I/O purposes; and
  configuring means for configuring the computing device to use the hidden port for general I/O purposes in response to a determination that the user-specifiable data value indicates that the hidden port is to be enabled for general I/O purposes.

35. The apparatus of claim 31 further comprising:
  determining means for determining, prior to configuring the computing device to use the hidden port for general I/O purposes, whether the computing device is a legacy-free device; and
  configuring means for configuring the computing device to use the hidden port for general I/O purposes in response to a determination that the computing device is a legacy-free device.

36. The apparatus of claim 31 wherein the hidden port is a debug header serial port.

37. The apparatus of claim 31 further comprising:
  mapping means for mapping between a port address for a logical, general purpose communication port and a port address for the hidden port.

* * * * *